United States Patent
Clark et al.

(10) Patent No.: US 10,742,818 B2
(45) Date of Patent: Aug. 11, 2020

(54) WIRELESS DENSITY-BASED ON-THE-FLY CODEC AND RADIO FREQUENCY LINK TYPE SELECTION

(71) Applicant: Plantronics, Inc., Santa Cruz, CA (US)

(72) Inventors: Mark Clark, Aptos, CA (US); Steve C Evans, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 139 days.

(21) Appl. No.: 15/680,043

(22) Filed: Aug. 17, 2017

(65) Prior Publication Data
US 2019/0058797 A1 Feb. 21, 2019

(51) Int. Cl.
| H04M 7/00 | (2006.01) |
| H04M 1/725 | (2006.01) |
| H04B 17/318 | (2015.01) |
| H04M 3/22 | (2006.01) |
| H04W 72/04 | (2009.01) |
| H04W 72/08 | (2009.01) |

(52) U.S. Cl.
CPC ........ *H04M 7/0072* (2013.01); *H04B 17/318* (2015.01); *H04M 1/72505* (2013.01); *H04M 3/2227* (2013.01); *H04W 72/0446* (2013.01); *H04W 72/085* (2013.01)

(58) Field of Classification Search
None
See application file for complete search history.

(56) References Cited

U.S. PATENT DOCUMENTS

| 7,043,210 | B2 | 5/2006 | Zhu et al. | |
| 7,103,325 | B1 | 9/2006 | Jia et al. | |
| 7,328,027 | B1 | 2/2008 | Mangal | |
| 2008/0081648 | A1 | 4/2008 | Kang et al. | |
| 2012/0002588 | A1* | 1/2012 | Roy | H04W 24/08 370/315 |
| 2015/0038160 | A1* | 2/2015 | Ngai | H04W 64/003 455/456.1 |

(Continued)

OTHER PUBLICATIONS

Aktas et al., "An Adaptive Codec Switching Scheme for SIP-Based VoIP," in Internet of Things, Smart Spaces, and Next Generation Networking, ser. Lecture Notes in Computer Science, Andreev, et al., Eds. Springer Berlin Heidelberg, Jan. 2012, 7469:347-358. [Online]. Available: https://www.comsys.rwth-aachen.de/fileadmin/papers/2012/2012-aktas-new2an-codecswitching.pdf.

(Continued)

Primary Examiner — Anez C Ebrahim

(57) ABSTRACT

A method is disclosed for wireless density-based on-the-fly codec and radio frequency link type selection. The method includes storing a link quality value, and scanning a plurality of timeslots across a plurality of wireless carriers. The method also includes calculating, based on the scanning, an average radio frequency density level for a time period. Still yet, the method includes calculating a current density level based on the link quality value and the average radio frequency density level. Further, the method includes selecting, based on the current density level, a codec from a plurality of stored codecs. The selected codec is associated with a link type. Moreover, the method includes receiving a command to open a wireless link, and, in response to the command, opening the wireless link using the selected codec and the associated link type.

20 Claims, 6 Drawing Sheets

(56) References Cited

U.S. PATENT DOCUMENTS

2016/0204908 A1* 7/2016 Rafique .................. H04L 1/203
    370/252

OTHER PUBLICATIONS

International Search Report and Written Opinion issued for international application No. PCT/US2018/046545, dated Nov. 26, 2018 (10 pages).

"Wireless Voice in the Office Environment", https://www.plantronics.com/content/dam/plantronics/documents-andguides/en/white-papers/UC-BluetoothDensity-WhitePapter.pdf, Plantronics, Mar. 20, 2015, 15 pages.

* cited by examiner

WIRELESS DENSITY-BASED ON-THE-FLY CODEC AND RADIO FREQUENCY LINK TYPE SELECTION

FIELD

The present disclosure relates generally to the field of telecommunications systems. More particularly, the present disclosure relates to DECT-based wireless telecommunications systems.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As companies embrace open office environments, employees find themselves working in closer proximity to each other. Moreover, as companies upgrade technology to facilitate mobility and collaboration, there is a strong trend to untether employees from their desks. One trend, for example, is the use of telephony devices operating in the Digital European Cordless Telecommunications or Unlicensed Personal Communications Services (UPCS) bands, including Digital Enhanced Cordless Telecommunications telephony devices (e.g., DECT 6.0 devices, etc.). Together, these devices are herein referred to as "DECT" devices or products, such as, for example, DECT handsets and DECT headsets. DECT products are well-suited for office use because of their increased range, and operation outside of the crowded 2.4 GHz band used by other wireless technologies such as Wi-Fi and Bluetooth. However, as more users install DECT devices at their workstations in a given environment, the RF density of the environment correspondingly increases, possibly limiting the number of DECT devices that can simultaneously operate. Further complicating matters, as IP-based networks become more robust, and both employees and customers demand increased call clarity, many employees configure their DECT devices to default to the highest quality call audio setting. These modes require greater bandwidth per DECT device, and further constrain the number of DECT devices that may simultaneously operate in a given environment.

SUMMARY

In general, in one aspect, a method is disclosed for wireless density-based on-the-fly codec and radio frequency link type selection. The method includes storing a link quality value, and scanning a plurality of timeslots across a plurality of wireless carriers. The method also includes calculating, based on the scanning, an average radio frequency density level for a time period. Still yet, the method includes calculating a current density level based on the link quality value and the average radio frequency density level. Further, the method includes selecting, based on the current density level, a codec from a plurality of stored codecs. The selected codec is associated with a link type. Moreover, the method includes receiving a command to open a wireless link, and, in response to the command, opening the wireless link using the selected codec and the associated link type.

In general, in one aspect, a system is disclosed for wireless density-based on-the-fly codec and radio frequency link type selection. The system includes a link quality buffer storing a link quality value, a user control, a circular buffer, a codec library, at least one processor, and memory coupled to the at least one processor. The memory stores instructions which, when executed by the at least one processor, cause the at least one processor to perform a process. The process includes scanning a plurality of timeslots across a plurality of wireless carriers, and, based on the scanning, calculating an average radio frequency density level for a time period. Also, the process includes storing the average radio frequency density level to the circular buffer, and calculating a current density level based on the link quality value and a contents of the circular buffer. Still yet, the process includes selecting, based on the current density level, a codec from the codec library. The selected codec is associated with a link type. Further, the process includes receiving, based on a manipulation of the user control, a command to open a wireless link, and, in response to the command, opening the wireless link. The wireless link is opened using the selected codec and the associated link type.

In general, in one aspect, a computer-readable media is disclosed for performing wireless density-based on-the-fly codec and radio frequency link type selection. The computer-readable media embodies instructions executable by a processor to store a link quality value, and scan a plurality of timeslots across a plurality of wireless carriers. Also, the computer-readable media embodies instructions executable by the processor to calculate, based on the scanning, an average radio frequency density level for a time period, and calculate a current density level based on the link quality value and the average radio frequency density level. Further, the computer-readable media embodies instructions executable by the processor to select, based on the current density level, a codec from a plurality of stored codecs. The selected codec is associated with a link type. Moreover, the computer-readable media embodies instructions executable by the processor to receive a command to open a wireless link, and, in response to the command, open the wireless link using the selected codec and the associated link type.

The details of one or more implementations are set forth in the accompanying drawings and the description below. Other features will be apparent from the description and drawings, and from the claims.

DETAILED DESCRIPTION

Figure 1A:
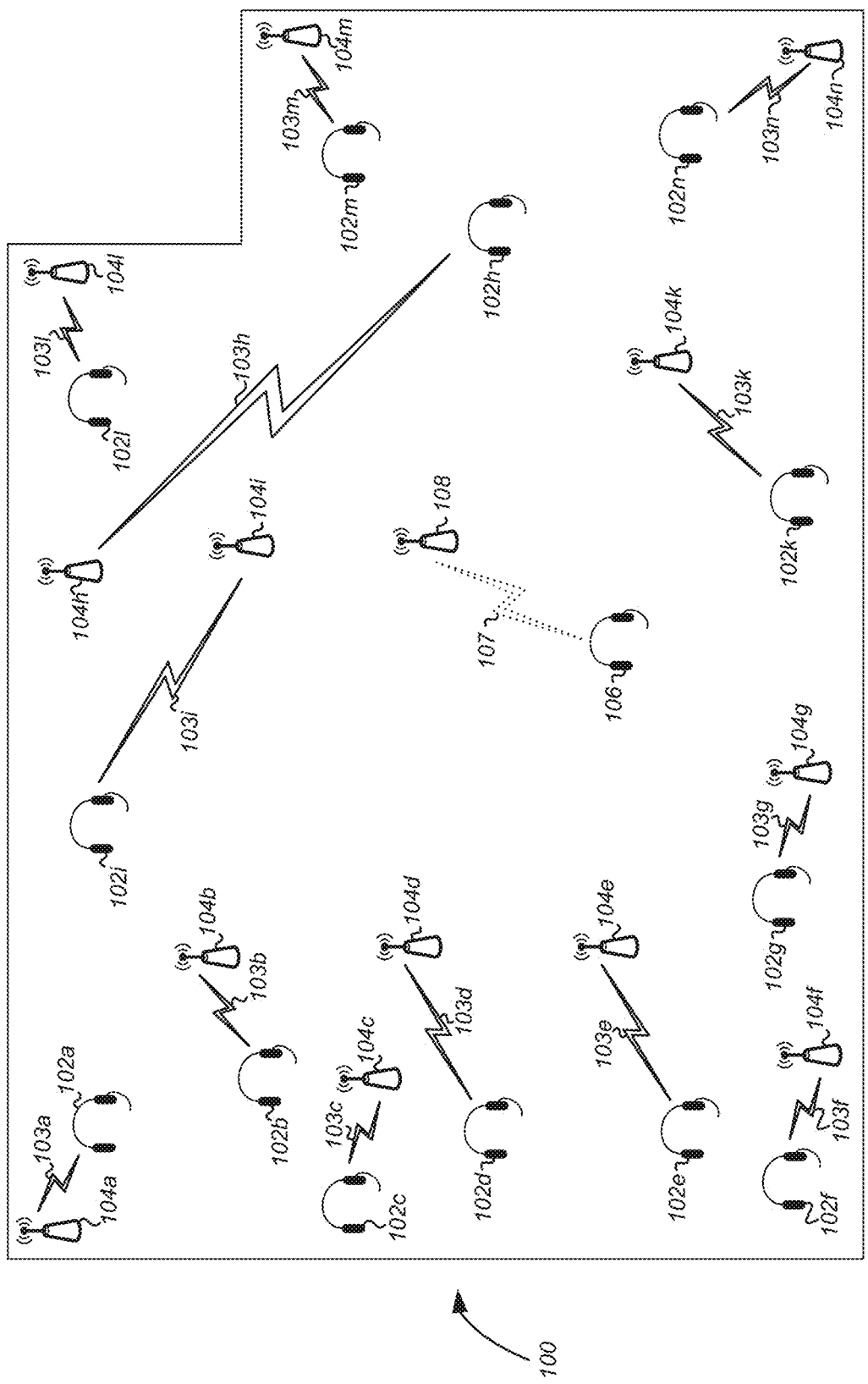
FIG. 1A depicts an environment for wireless density-based on-the-fly codec and radio frequency link type selection, in accordance with one or more embodiments of the invention.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

In enterprise wireless telephony products, when a user operates a control (e.g., pushes a button, selects an element in a graphical user interface, etc.) to open an active wireless link (e.g., make a call, answer a call, etc.), their headset or handset must always succeed in opening the connection. Any missed or dropped call reflects poorly upon the user and/or the company represented by the user, creating a poor customer experience and resulting in undue customer frustration. Prior generations of DECT products have generally allowed a user to select whether their device would operate in one of two modes: narrowband audio or wideband audio. Narrowband audio is generally considered to include any audio encoded using an 8 kHz sampling rate. Wideband audio is generally considered to include any audio encoded using a 16 kHz sampling rate. Due to inherent network limitations of the public switched telephone network (PSTN), narrowband audio was long considered "good enough." However, with the widespread shift to voice over Internet Protocol (VoIP) communications, including video conferencing and teleconferencing systems, enterprises have increasingly relied on wideband audio in their business applications in order to facilitate clearer communications. Although wideband audio requires greater network capabilities relative to narrowband audio, these requirements have been met by the adoption of high speed wired and wireless local area networks (LANs) on enterprise campuses.

However, in the context of the 1.8 or 1.9 GHz bands used by DECT headsets and handsets, the physical media cannot be replicated or otherwise expanded. A given wideband audio connection will use greater radio bandwidth than a narrowband audio connection for the same call. Thus, as more users in an environment elect to use wideband audio on their DECT devices, the number of DECT devices that can concurrently hold active wireless links is reduced. Looking forward, as local area networks become faster and more capable, and more users switch to VoIP communications, more users will expect higher quality streaming multimedia and call audio at their DECT devices—including stereo streaming of audio sampled at rates of 16 kHz, 20 kHz, 48 kHz, and beyond using audio codecs that inherently require greater carrier bandwidth. Thus, with a fixed channel capacity on RF media, the shift to higher quality audio communications will further limit the number of devices that can simultaneously hold active wireless links in a given environment. As a result, users may be at an increased risk to miss calls, or be unable to place a call, because there is not enough radio spectrum available to open a new wireless link.

In general, embodiments of the invention provide a system, a method, and a computer readable medium for wireless density-based on-the-fly codec and radio frequency (RF) link type selection. The systems and methods described herein are operable to monitor radio spectrum to identify available carriers and timeslots, as well as noisy or utilized carriers and timeslots. From this information, spectral RF density over a moving window of time may be tracked. Also, the systems and methods described herein are operable to assess the user experience of past phone calls using call quality metrics. Further, the systems and methods described herein are operable to calculate a link quality value based on the call quality metrics and the spectral RF density. Using the link quality value, the optimal codec for a new DECT link may be selected on-the-fly, as the new wireless link is opened.

Headsets and handsets operating in accordance with the present disclosure will ensure that a user is presented with the highest quality audio when environmental conditions allow, and automatically optimize link type and audio quality as the spectral density of an environment increases, such as when a greater number of users have active wireless links. Accordingly, the devices deployed to a given environment may continuously monitor environmental radio density and active call quality in order to maximize both the number of simultaneous links that can be maintained at one time, as well as the audio quality for each of the individual links.

FIG. 1A shows an environment 100 implementing wireless density-based on-the-fly codec and RF link type selection, according to one or more embodiments. Although the elements of the environment 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1A may be omitted, repeated, and/or substituted. Accordingly, various embodiments may lack one or more of the features shown. For this reason, embodiments of the invention should not be considered limited to the specific arrangements of elements shown in FIG. 1A.

As depicted in FIG. 1A, an environment 100 includes several wireless headsets 102 (i.e., wireless headsets 102a-102n). Each of the wireless headsets 102 currently maintains an open (i.e., active) wireless link 103 (i.e., wireless links 103a-103n) with a corresponding base station 104 (i.e., base stations 104a-104n, respectively). In other words, each of the active links 103 connects a wireless headset 102 and a corresponding base station 104. For example, a first wireless link 103a is open between a first wireless headset 102a and a first base station 104a; a second wireless link 103b is open between a second wireless headset 102b and a second base station 104b; a third wireless link 103c is open between a third wireless headset 102c and a third base station 104c, and so on. Also, the environment 100 includes an inactive wireless headset 106 that is paired with a base station 108. The headset 106 may have previously registered with the base station 108. Other than the absence of an active link (e.g., phone call, streaming audio, etc.) between the wireless headset 106 and the base station 108, the wireless headset 106 may be substantially identical to the wireless headsets 102, and the base station 108 may be substantially identical to the base stations 104.

The environment 100 may include any physical space occupied by one or more persons at a given time. The environment 100 may include one or more rooms in a building, such an office or industrial building. The environment 100 may include one or more of offices, an open workspace, a factory floor, etc. For example, the environment 100 may include a call center or an assembly line. For each active wireless link 103 between a headset 102 and a base station 104, a user is presently engaged in a phone call with a third-party (e.g., a customer, a client, a co-worker, a manager, etc.) or otherwise sending and/or receiving streaming audio.

As described herein, each of the wireless links 103 includes a link operating according to the ETSI standard for Digital Enhanced Cordless Telecommunications (DECT), in either the 1880 MHz-1900 MHz frequency band or the 1920 MHz-1930 MHz frequency band, the details of which are beyond the scope of the present document. Accordingly, each of the wireless headsets 102 is a DECT headset (i.e., portable part), and each of the base stations 104 is a DECT base station (i.e., fixed part). As used herein, the term "DECT" (e.g., a "DECT link," "DECT device," "DECT headset," "DECT handset," "DECT transceiver," etc.) is understood to include links formed and devices operating in the Digital European Cordless Telecommunications or Unlicensed Personal Communications Services (UPCS) bands, including the Digital Enhanced Cordless Telecommunications standard used in North America. Similarly, as used herein, a "DECT channel" is understood to include a DECT or UPCS channel; and a "DECT carrier" is understood to include a DECT or UPCS carrier. For purposes of simplicity and clarity, the present disclosure describes the invention in the context of the wireless headsets 102, however it is understood that one or more of the wireless headsets 102 of FIG. 1A may be replaced with a handset that operates in accordance with the methods and systems disclosed herein. In other words, the systems and methods disclosed herein may be performed by either DECT handsets and/or DECT headsets, however for purposes of clarity the present disclosure simply refers to headsets.

As depicted in FIG. 1A, an inactive link 107 exists between the headset 106 and the base station 108. The inactive link 107 may include one or more periodic transmissions (e.g., beacons, etc.) between the base station 108 and the headset 106. For example, during periods of inactivity (i.e., no audio transmissions between the headset 106 and the base station 108), the headset 106 may lock to a beacon signal transmitted by the base station 108 over the inactive link 107.

At any arbitrary moment, a user wearing the headset 106 may attempt to convert the inactive link 107, between the headset 106 and the base station 108, to an active link. For example, the user may attempt to open a new active link by manipulating a control on the headset 106 or the base station 108. The user may attempt to open a new active link so that he or she may dial a phone number and initiate an outgoing call; or the user may attempt to open the new active link so that he or she may answer an incoming call. An active link includes any DECT link in which audio is transmitted from and/or received at the headset 106. Depending on the physical characteristics of the environment 100, other electronic devices operating in the environment 100, and the operating parameters (e.g., power, link type, etc.) of the wireless headsets 102, the environment 100 may support a density of tens or hundreds of simultaneous active wireless links 103 between the wireless headsets 102 and base stations 104. Thus, under some circumstances, the headset 106 may not be able to open an active link to the base station 108. In such circumstances, a user of the headset 106 may miss a call, or be unable to place an outgoing call. The systems and methods described below help to ensure not only that an active link may be opened, but also to maximize both the number of active wireless links 103 in the environment 100, and to maximize the call quality on each of the active wireless links 103.

Figure 1B:
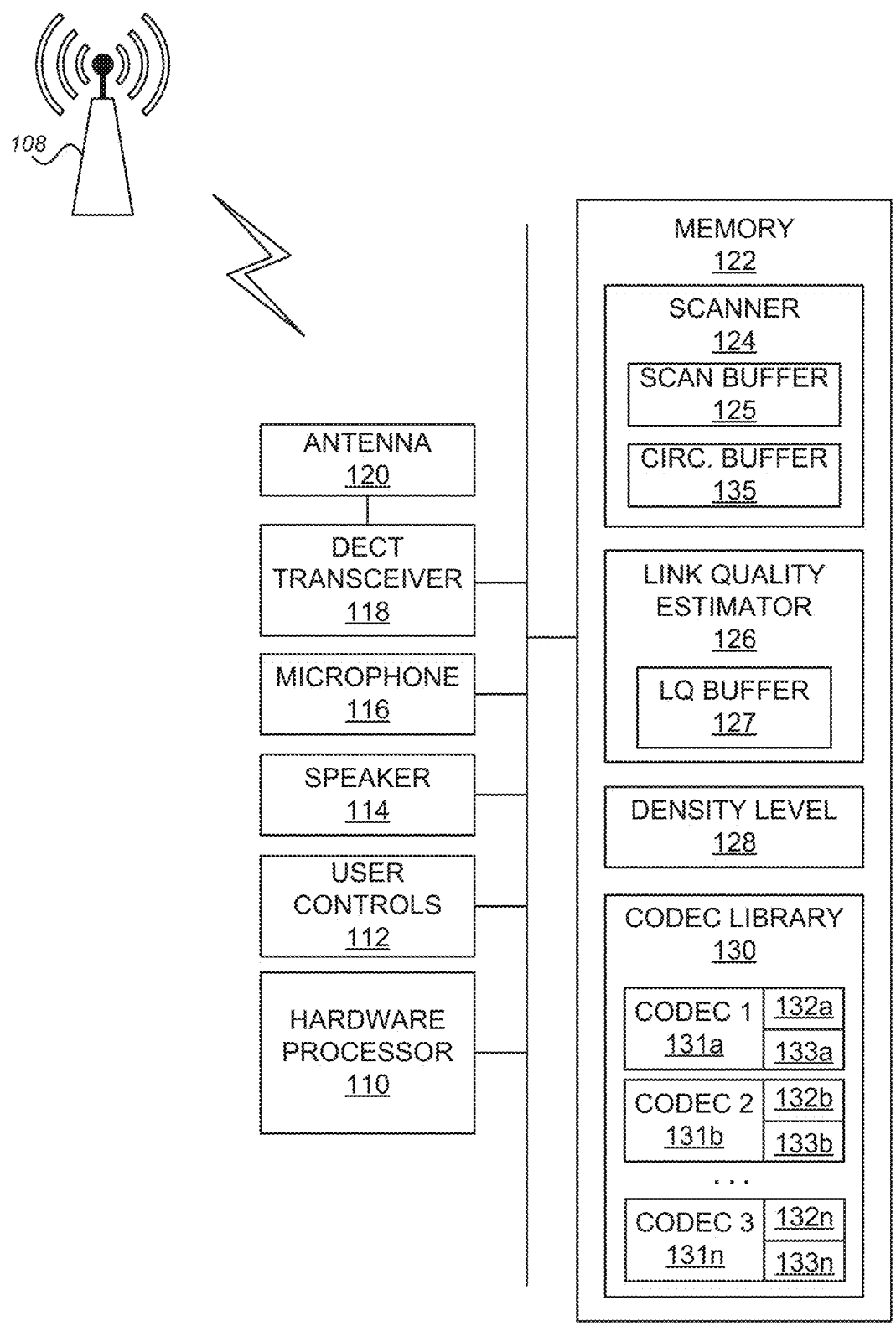
FIGS. 1B and 1C depict a block diagram of a headset for wireless density-based on-the-fly codec and radio frequency link type selection, in accordance with one or more embodiments of the invention.

FIG. 1B shows a block diagram of a headset 106 for wireless density-based on-the-fly codec and RF link type selection, according to one embodiment. Although the elements of the headset 106 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1B may be omitted, repeated, and/or substituted. Accordingly, various embodiments may lack one or more of the features shown. For this reason, embodiments of the invention should not be considered limited to the specific arrangements of elements shown in FIG. 1B.

As shown in FIG. 1B, the headset 106 includes a hardware processor 110 operably coupled to a memory 122, a microphone 116, a speaker 114, one or more user controls 112, and a DECT transceiver 118. In one or more embodiments, the hardware processor 110, the memory 122, the microphone 116, the speaker 114, the user controls 112, and the DECT transceiver 118 may remain in communication over one or more communications busses. The headset 106 may include a monaural headset or stereo headset (including multiple speakers 114), whether worn by a user over-the-ear (e.g., circumaural headphones, etc.), in-ear (e.g., earbuds, earphones, etc.), or on-ear (e.g., supraaural headphones, etc.).

The microphone 116 includes any device that transforms received sound waves into a detectable electric current. The speaker 114 includes any device that transforms an electric current into sounds heard by a user of the headset 106.

As described herein, the DECT transceiver 118 includes any device operable to perform transmit and receive RF signal processing according to the DECT standard. Accordingly, the DECT transceiver 118 may be a transmission and reception radio interface between the antenna 120 and a digital baseband signal sent over a bus of the headset 106. The DECT transceiver 118 may include one or more blocks to perform digital modulation and demodulation of baseband signals. An antenna 120, coupled to the DECT transceiver 118, converts electric power into radio waves under the control of the DECT transceiver 118, and intercepts radio waves which it converts to electric power and provides to the DECT transceiver 118. Accordingly, by way of the DECT transceiver 118 and the antenna 120, the headset 106 may establish a link (e.g., an inactive link, an active link, etc.) with the base station 108.

The user controls 112 include any mechanism of the headset 106, mechanical and/or electronic, that responds to user operation. The user controls 112 may include one or more of a button, a switch, a capacitive sensor, a touch screen, etc. The hardware processor 110 may control the opening of a link, the termination of an active link, or the transmission of messages to a base station, via the DECT transceiver 118, in response to user operation (e.g., button presses, switches, etc.) of the user controls 112.

As described herein, the hardware processor 110 processes data, including the execution of applications and routines stored in the memory 122. In one or more embodiments, the hardware processor 110 is a high performance, highly integrated, and highly flexible system-on-chip (SOC), including signal processing functionality such as echo cancellation/reduction and gain control in another example. In one or more embodiments, the hardware processor 110 may include a variety of processors (e.g., digital signal processors, etc.), analog-to-digital converters, digital-to-analog converters, etc., with conventional CPUs being applicable.

As described herein, the memory 122 includes any storage device capable of storing information temporarily or permanently. The memory 122 may include volatile and/or non-volatile memory, and may include more than one type of memory. For example, the memory 122 may include one or more of SDRAM, ROM, and flash memory. As depicted in FIG. 1B, the memory 122 includes a scanner 124 and a link quality estimator 126. Also, the memory 122 stores a density level 128 and a codec library 130. The scanner maintains a scan buffer 125 and a circular buffer 135. The codec library 130 includes a plurality of codecs 131, each of which is associated with a link type 132 and a density threshold 133. Each of these elements is described below.

The scanner 124 is a routine operable to periodically scan an environment of the headset 106, such as the environment 100 described in reference to FIG. 1A. For example, the scanner 124 may cause the headset 106 to scan the RF spectrum of the environment 100 every 1 second, 5 seconds, 15 seconds, 30 seconds, etc. While scanning the environment, the scanner 124 measures RF signal strength on DECT channels. Moreover, based on the measured RF signal strength (Received Signal Strength Indication (RSSI)) across the DECT channels, the scanner 124 generates a channel map that lists the occupied and free channels of the environment. As used herein, a channel is a combination of a DECT carrier and timeslot. The results of such a scan are stored to the scan buffer 125. Accordingly, the scan buffer 125 may include a channel map that lists one or more idle timeslots on one or more carriers. Within the channel map, a low RSSI value associated with a carrier and timeslot may indicate that the timeslot is currently not in use, and therefore available; while a high RSSI value associated with a carrier and timeslot may indicate that the timeslot is currently in use by another device within the environment.

In one or more embodiments, the scan buffer 125 may include an array of data structures indexed by timeslot number (e.g., 0-23, 0-239, etc.). Each data structure may indicate, for a given timeslot number, the highest RSSI carrier, the value of the highest RSSI carrier, the lowest RSSI carrier, and the value of the lowest RSSI carrier. As timeslots across carrier frequencies are scanned, the highest and lowest RSSI values may be stored to the array of data structures. Specifically, during scanning by the scanner 124, whenever an RSSI value is measured that is greater than or less than the value of the highest RSSI carrier or the value of the lowest RSSI carrier at the current index in the data structure, respectively, a stored RSSI carrier value may be replaced by the newly measured value. For example, for a given timeslot, if, during scanning, a measured RSSI value is less than the value of the lowest RSSI value in the data structure associated with the timeslot, then the measured RSSI value will replace the lowest RSSI value previously stored to the data structure. Also, the RSSI carrier may replace the lowest RSSI carrier previously stored to the data structure. Similarly, for a given timeslot, if, during scanning, a measured RSSI value is greater than the value of the highest RSSI value in the data structure associated with the timeslot, then the measured RSSI value will replace the highest RSSI value previously stored to the data structure. Also, the RSSI carrier may replace the highest RSSI carrier previously stored to the data structure.

Further, the scanner 124 is shown to maintain the circular buffer 135. In one or more embodiments, the values in the array of data structures indexed by timeslot number may be periodically averaged across timeslots. For example, the values may be averaged every 1 minute, 5 minutes, 10 minutes, 20 minutes, 30 minutes, 1 hour, 2 hours, 4 hours, etc. Further, the circular buffer 135 may be configured to the store the results of a predetermined number of the most recent averaging operations. For example, the circular buffer 135 may store the results of the most recent 3, 5, 10, 15, 50, etc. averaging operations. In this way, the circular buffer 135 may include a moving average of relative RF density levels in an environment across a number of different timeslots. In other words, the circular buffer 135 may store a moving average of relative RF density levels as calculated every 1 minute, 5 minutes, 10 minutes, 20 minutes, 30 minutes, etc., for the last 5 minutes, 10 minutes, 30 minutes, 1 hour, 4 hours, etc.

Figure 1C:
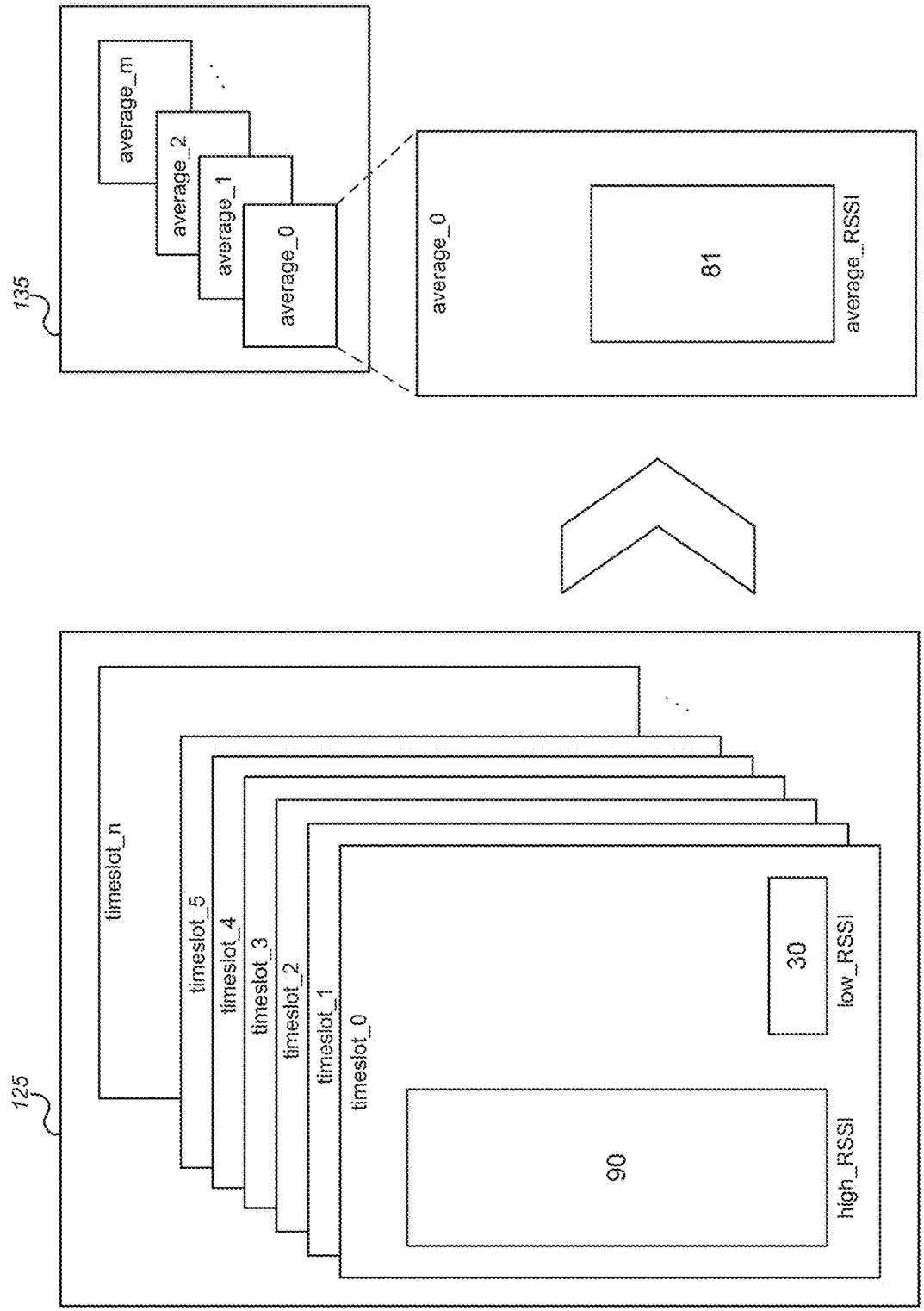

By way of further example, FIG. 1C depicts an exemplary contents of the scan buffer 125, in accordance with one or more embodiments. As depicted in FIG. 1C, the scan buffer 125 includes, for each timeslot from timeslot_0 to timeslot_n, the measured highest RSSI carrier value and the measured lowest RSSI carrier value. For example, for timeslot_0, the value of the highest RSSI carrier is 90 (i.e., high_RSSI) and the value of the lowest RSSI carrier is 30 (i.e., low_RSSI). For simplicity and clarity, the values selected to illustrate the example of FIG. 1C are positive integers, but it is understood that the values may be recorded and stored as any suitable value (e.g., −85 dBm, 20 dB, etc.). Although not shown, it is understood that high_RSSI and low_RSSI values are maintained for each of timeslots 0 to n. Moreover, for each of the timeslots, the high_RSSI and low_RSSI values may be updated on a first periodic basis, such as, for example, every 1 second, 5 seconds, 15 seconds, 30 seconds, 1 minute, etc.

Further, on a second periodic basis (e.g., every 5 minutes, 10 minutes, 30 minutes, 1 hour, 4 hours, etc.), the contents of the scan buffer 125 are averaged. As depicted in FIG. 1C specifically, the high_RSSI and low_RSSI values across timeslots 0 . . . n are averaged to generate the result average_0. The result average_0 includes an average_RSSI value of 81. Although average_0 is depicted to include a single value (i.e., 81) that is calculated using both the highest RSSI carrier values (i.e., high_RSSI) and the lowest RSSI carrier values (i.e., low_RSSI) across the timeslots 0-n, it is contemplated that, in one or more embodiments, average_0 may include separate averages for the highest RSSI carrier values and the lowest RSSI carrier values across the timeslots 0-n.

The resulting average RF density level (i.e., average_0) is stored to the circular buffer 135. Because the circular buffer 135 is intended to reflect a moving average of relative RF density levels, when the average_0 result is stored to the circular buffer 135, all results are advanced by 1 such that the oldest average result is removed from the circular buffer 135. In other words, average_[m−1] becomes average_m, and the previously stored average_0 becomes average_1. The circular buffer 135 may store any suitable number of averaging results. Thus, the circular buffer 135 may indicate how RF density levels have changed over the past 30 minutes, 1 hour, 2 hours, etc. This may be accounted for in calculations of the density level 128.

Referring again to FIG. 1B, the link quality estimator 126 includes any routine operable to measure the audio quality of a telephone call. In one or more embodiments, when the headset 106 is connected to the base station 108 for an active telephone call, the link quality estimator 126 periodically calculates a link quality value. For example, the link quality estimator may calculate a link quality value every 0.5 second, 1 second, 5 seconds, 10 seconds, etc. during an active link. The link quality value may represent a measure of one or more of errors, perceived voice quality, listening quality, transmission quality, conversational quality, echo, noise, and distortion. Accordingly, a link quality value may serve as a metric by which to measure perceived call audio performance and/or voice degradation. In one or more embodiments, the link quality value may be constrained to any suitable range of values. For example, the link quality value may be a score within a range of between 0 and 1, between 0 and 5, between 1 and 5, between 1 and 10, between 1 and 100, etc.

One example of known metrics that may serve as link quality values include mean opinion scores (MOS). Thus, a link quality value may be reduced based on artifacts detected in a phone call, such as, for example, pops, jitter, and/or drops. Because not all office environments are the same, the link quality estimator 126 helps to dynamically identify issues that may affect call quality outside of RF spectrum utilization. For example, as an employee walks around during a call, perhaps traversing the floor of the environment 100 of FIG. 1A and introducing interference into the call, output from the link quality estimator 126 serves to account for the effect of the user's habits and activities, as detected in his or her prior telephone calls.

In one or more embodiments, several link quality values are stored to the link quality buffer 127. The link quality buffer 127 may store a predetermined number of sequentially calculated link quality values. For example, the link quality buffer 127 may store a number of link quality values for the last 1 minute, 5 minutes, 10 minutes, 30 minutes, 1 hour, 4 hours, etc. of active telephone calls. In other words, the link quality estimator 126 may calculate and store to the link quality buffer 127 a new link quality value every 0.5 second, 1 second, 5 seconds, 10 seconds, etc., for the last 5 minutes, 10 minutes, 30 minutes, 1 hour, 4 hours, etc., in which there was an active telephone call. Accordingly, the link quality buffer 127 may evidence trends in link quality over a given period of time.

In one or more embodiments, the link quality buffer 127 may store link quality values across the same period of time for which RSSI values are averaged in the circular buffer 135. For example, if the circular buffer stores a moving average of relative RF density levels for the last 5 minutes, 10 minutes, 30 minutes, 1 hour, or 4 hours, then the link quality buffer 127 may store link quality values for calls conducted during the same 5-minute, 10-minute, 30-minute, 1-hour, or 4-hour period, respectively. This may allow for an accurate representation of link quality and call quality over a given fixed window of time, as well as for identifying any correlation between the two.

Additionally, the codec library 130 stores a number of codecs 131. As illustrated in FIG. 1B, the codec library 130 includes three codecs 131 (i.e., a first 131*a*, a second codec 131*b*, and a third codec 131*n*), however it is contemplated that the codec library 130 may include any number of different codecs 131. The number of codecs 131 maintained in the codec library 130 (i.e., 'n') is unrelated to the number of timeslots (i.e., 'n') for which RSSI values are tracked in FIG. 1C.

As described herein, each of the codecs is operable to encode and/or decode an audio stream received via the microphone 116 and/or the via the DECT transceiver 118. In other words, each of the codecs may encode an audio stream based on audio picked up by the microphone 116, and/or decode an audio stream received from the base station 108 over an active wireless link. As an option, each of the codecs 131 may include a different sampling rate, a different bitrate, a different number of channels, a different compression rate, and/or a different decompression rate relative to one or more of the other codecs 131 in the codec library 130. For example, the first codec 131*a* may be operable to sample call audio at a first sampling rate (e.g., narrowband audio, etc.), while the second codec 131*b* is operable to sample call audio at a second sampling rate (e.g., wideband audio, etc.) greater than the first sample rate, and the third codec 131*n* is operable to sample call audio at a third sampling rate (e.g., full stereo audio, etc.) greater than or equal to the second sampling rate. As another example, one or more of the codecs 131 may be operable to compress/decompress only a single channel of audio (i.e., mono audio), while the remainder of the codecs 131 are operable to compress/decompress two channels of audio (i.e., stereo audio). As yet another example, the first codec 131*a* may be operable to encode/decode at a first bitrate, the second codec 131*b* may be operable to encode/decode at a second bitrate greater than the first bitrate, and the third codec 131*c* may be operable to encode/decode at a third bitrate greater than or equal to the second bitrate.

In one or more embodiments, each of the codecs 131 is associated with a link type 132. For example, the first codec 131*a* is shown associated with a first link type 132*a*, the second codec 131*b* is shown associated with a second link type 132*b*, and the third codec 131*n* is shown associated with a third link type 132*n*. Accordingly, the present description may refer to a codec and link type pairing. As used herein, a link type 132 includes any physical layer requirements for transmission of an audio bit stream that is encoded/decoded by the associated codec 131. For example, a low bitrate codec may require only a single timeslot, or a portion of a timeslot, on an uplink channel and/or a downlink channel; whereas a higher bit rate codec may require multiple timeslots on the uplink channel and/or the downlink channel. Thus, each codec 131 may be associated with a unique packet length and/or timeslot utilization relative to the other codecs 131 in the codec library 130. As an option, two codecs may be associated with the same link type 132. For example, the second link type 132*b* and the third link type 132*n* may share the same physical layer requirements, or the second link type 132*b* and the third link type 132*n* may have different physical layer requirements.

In one or more embodiments, a single modulation scheme is used for the different link types 132 and codecs 131. In other words, the modulation scheme used by the DECT transceiver 118 may not change due to the codec 131 selected from the codec library 130 and its associated link type 132.

Referring still to FIG. 1B, the density level 128 includes a value representative of a current density level in the environment of the headset 106, such as the environment 100 of FIG. 1A. The contents of the link quality buffer 127 (i.e., link quality values) and the circular buffer 135 (i.e., relative density levels) may be used by the hardware processor 110 to compute the density level 128. The density level 128 may include any suitable representation of the current RF density level in an environment. For example, the density level 128 may be a value with a potential range between 0 and 1, between 1 and 4, between 1 and 10, between 1 and 100, etc. In one or more embodiments, the density level 128 may include a percentage value.

In one or more embodiments, the headset 106 may continuously update the density level 128. For example, the density level 128 may be updated periodically (e.g., every 1 second, 5 seconds, 30 seconds, 1 minute, etc.) based on the contents of the circular buffer 135 and the link quality buffer 127. Based on the density level 128, one or more of the codecs 131 in the codec library 130 may be unavailable to the headset 106 when the headset 106 opens a DECT link to the base station 108. In other words, based on the density level 128, only a subset of the codecs 131 in the codec library 130 may be available for creating an active DECT link with the base station 108. For example, as the density level 128 increases, the number of permissible link types 132 may decrease, which in turn restricts the number of codecs 131 in the codec library 130 that may be utilized.

In one or more embodiments, which of the codecs 131 may be utilized is determined by comparing the density level 128 to one or more density thresholds 133. As shown in FIG. 1B, each of the codecs 131 is associated with a density threshold 133. The density thresholds 133 may assume any value that facilitate a comparison with the density level 128. For example, each of the density thresholds 133 may be constrained by a range between 0 and 1, between 1 and 4, between 1 and 10, between 1 and 100, etc. In one or more embodiments, the density thresholds 133 may include percentage values. For example, the first density threshold 133*a* may be 95%, the second density threshold 133*b* may be 50%, and the third density threshold 133*n* may be 10%. Whenever any of the density thresholds 133 is exceeded by the density level 128, then the codecs 131 associated with the exceeded density thresholds 133 may be determined unavailable. For example, if the density level 128 is calculated as 60%, the first density threshold 133*a* is 95%, the second density threshold 133*b* is 50%, and the third density threshold 133*n* is 20%, then the second codec 131*b* and the third codec 131*n* may be unavailable for use when opening a new active wireless link. However, if the density level 128 drops to 30%, then the second codec 131*b* may become available for use when opening the active wireless link between the headset 106 and the base station 108. Continuing the example, the third codec 131*n* may not be available for use until the density level 128 drops below the third density threshold 133*n* of 20%.

Figure 2:
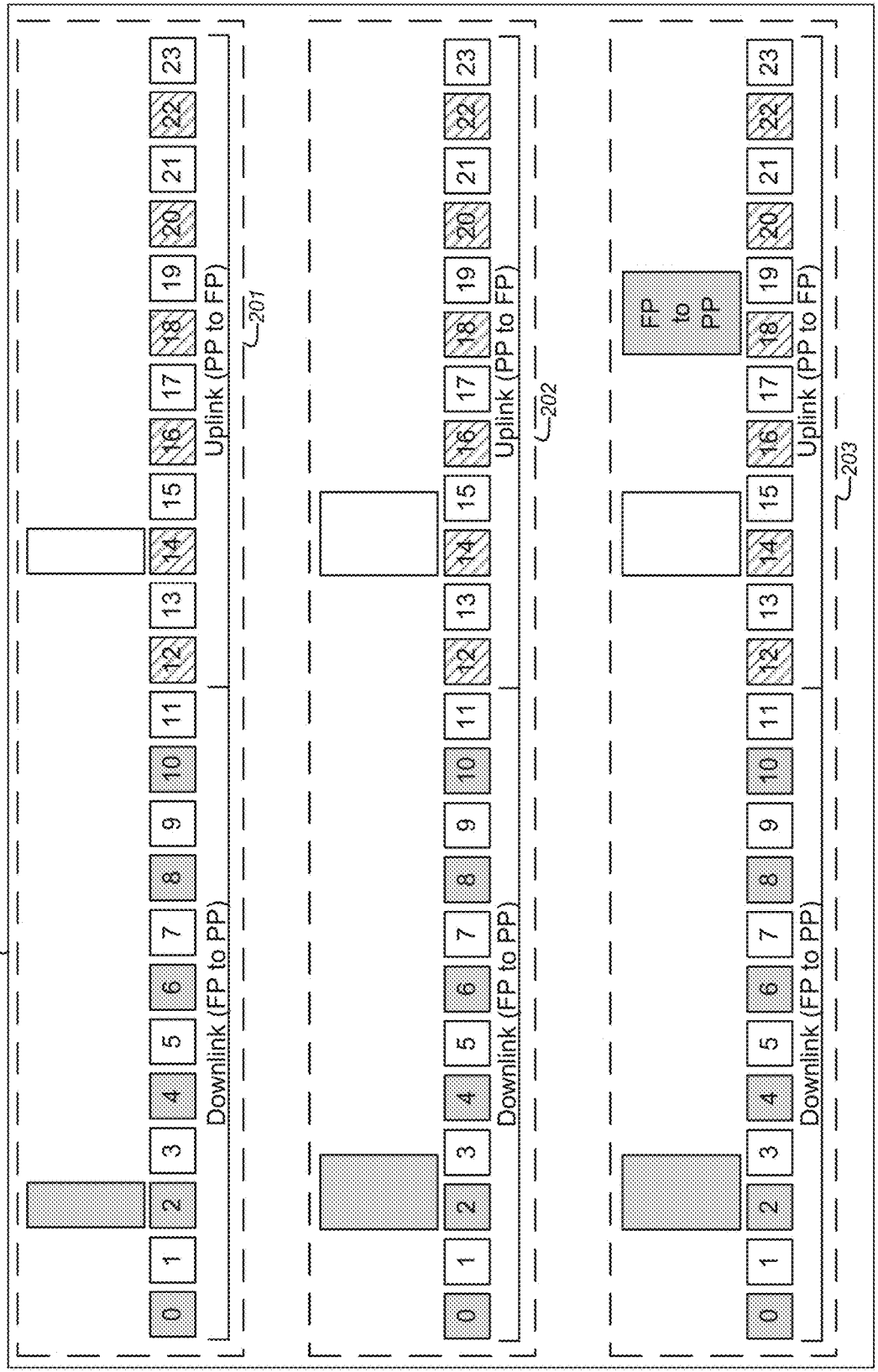
FIG. 2 illustrates an association between codecs and link types for wireless density-based on-the-fly codec and radio frequency link type selection, in accordance with one or more embodiments of the invention.

FIG. 2 shows a block diagram of a codec library 230 for implementing wireless density-based on-the-fly codec and RF link type selection, according to one or more embodiments. Although the elements of the codec library 230 are presented in one arrangement, other embodiments may feature other arrangements, and other configurations may be used without departing from the scope of the invention. For example, in one or more embodiments of the invention, one or more of the elements shown in FIG. 2 may be omitted and/or substituted. Accordingly, various embodiments may lack one or more of the features shown. For this reason, embodiments of the invention should not be considered limited to the specific arrangements of elements shown in FIG. 2.

FIG. 2 helps to illustrate the association between a link type and a codec in the codec library 230. The codec library 230 may be substantially identical to the codec library 130 described in the context of FIG. 1B, such that the codec library 230 is stored to the memory 122 of the headset 106 of FIGS. 1A and 1B. The codec library includes a first codec 201, a second codec 202, and a third codec 203. Accordingly, the first codec 131*a* of the codec library 130 may include the first codec 201 of FIG. 2, the second codec 131*b* of the codec library 130 may include the second codec 202 of FIG. 2, and the third codec 131*n* of the codec library 130 may include the third codec 203 of FIG. 2. The description of FIG. 2 is strictly to illuminate the benefits of having available three different codecs, each associated with a different link type and density threshold, and should not be construed as limiting the methods and systems disclosed herein to only utilizing the codecs 201-203 as described below.

As depicted in FIG. 2, the first codec 201 is associated with a symmetric single slot link type, utilizing a single timeslot (i.e., timeslot 2) on the downlink (i.e., from the base station to the headset), as well as a single timeslot (i.e., timeslot 14) on the uplink (i.e., from the headset to the base station). In one or more embodiments, the first codec 201 may encode/decode mono audio sampled at 16 kHz to achieve a 32 kbps bitrate using approximately 8 kHz bandwidth. The first codec 201 may include, for example, the BroadVoice32 codec.

In one or more embodiments, using, for example, the BroadVoice16 codec, mono audio sampled at 8 kHz may be encoded/decoded to achieve a 16 kbps bitrate using approximately 4 kHz bandwidth. Use of the BroadVoice16 codec may be associated with a link type that occupies a shorter timeslot (e.g., ½ of a single timeslot, etc.).

As depicted in FIG. 2, the second codec 202 is associated with a symmetric multi-slot link type, utilizing two timeslots (i.e., timeslots 2 and 3) on the downlink, as well as two timeslots (i.e., timeslots 14 and 15) on the uplink. In one or more embodiments, the second codec 202 may decode stereo audio sampled at 16 kHz to achieve a 64 kbps bitrate using approximately 8 kHz bandwidth on the downlink. The second codec 202 may include, for example, a CELT codec. In one or more embodiments, the second codec 202 may encode mono audio sampled at 16 kHz to achieve a 64 kbps bitrate using approximately 8 kHz bandwidth on the uplink. The second codec 202 may include, for example, a G.722 codec.

Still yet, as depicted in FIG. 2, the third codec 203 is associated with an asymmetric multi-slot link type, utilizing two timeslots (i.e., timeslots 2 and 3) on the downlink, and two sets of two timeslots (i.e., timeslots 14-15 and 18-19) on the uplink. In particular, the asymmetric link relies on transmitting from the FP to the PP in an uplink half-frame (i.e., timeslots 18 and 19). In one or more embodiments, the third codec 203 may decode stereo audio sampled at 48 kHz to achieve a 128 kbps bitrate using approximately 20 kHz bandwidth from the base station to the headset (i.e., FP to PP). The third codec 203 may encode mono audio sampled at 16 kHz to achieve a 64 kbps bitrate using approximately 8 kHz bandwidth from the headset to the base station (i.e., PP to FP). The third codec 203 may include, for example, a CELT codec.

Utilizing the systems and methods disclosed herein, a headset may select on-the-fly one of the three codecs 201-203 to use based on a calculated density level. The density level may account for both link quality during prior phone calls, as well as a measure of RF spectral density, as described above. For example, and assuming that the codec library 230 is installed on the headset 106 of FIG. 1B, in order to use the third codec 203, the density level 128 of the environment of the headset 106 may be required to be below a density threshold associated with the third codec 203. Similarly, in order to use the second codec 202, the density level 128 of the environment of the headset 106 may be required to be below a second density threshold that is greater than the density threshold of the third codec 203. In other words, because the second codec 202 is associated with a link type that utilizes less bandwidth than the link type associated with the third codec 203, the second codec 202 may be utilized in an environment where the third codec 203 is not permitted due to an increased spectral density and its effects on call quality. Still yet, utilization of the first codec 201 may be permitted when the density level 128 of the environment of the headset 106 is below a third density threshold that is greater than the second density threshold. Thus, because the first codec 201 is associated with a link type that utilizes less bandwidth than the link types associated with the second codec 202 and the third codec 203, the first codec 201 may be utilized in an environment where the second codec 202 and the third codec 203 are not permitted due to a greatly increased spectral density and its adverse effects on call quality.

In one or more embodiments, a headset may be configured such that a codec and link type pair are configured as the default codec and link type for the headset. For example, a user may set his or her headset to default to 20 kHz stereo audio, thereby selecting the third codec 203 of FIG. 2, and its associated link type, as the defaults. During a given workday, the headset continuously computes the density level of its environment, and may determine that the spectral RF density of its environment is increasing. As a result, the number of link types available for use by the headset may be restricted. In other words, when the user attempts to open a new wireless link, the headset may open a link using a codec that does not provide 20 kHz stereo audio, despite the user's default selection. For example, the headset may open the new wireless link using an 8 kHz mono codec or an 8 kHz stereo codec, thereby reducing the bandwidth needed on the uplink and/or the downlink. Still further, as the density level is computed and updated, and reflects that the spectral RF density of the environment of the headset is decreasing, the number of link types available for use by the headset may become less restrictive, such that the headset may open a new link using a higher bandwidth link type and codec, including the user's selected default.

Figure 3:
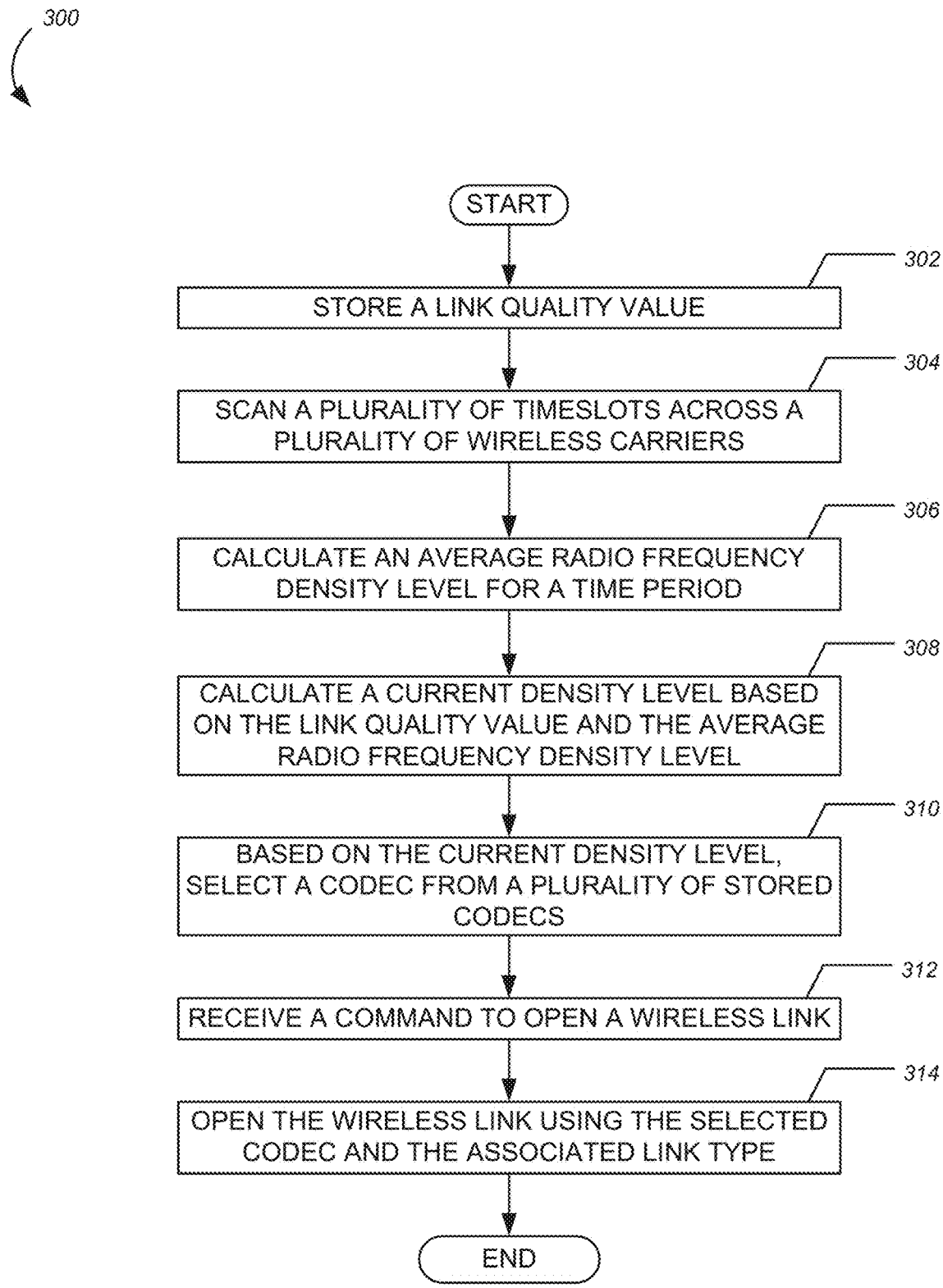
FIG. 3 is a flow diagram showing a method for wireless density-based on-the-fly codec and radio frequency link type selection, in accordance with one or more embodiments of the invention.

FIG. 3 shows a flowchart of a method 300 for wireless density-based on-the-fly codec and radio frequency link type selection, in accordance with one or more embodiments of the invention. While the steps of the method 300 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. By way of an example, determination steps may be performed by performing a test, such as checking a data value to test whether the value is consistent with the tested condition in accordance with one or more embodiments of the invention. The method 300 of FIG. 3 may be performed by a DECT handset or headset, such as the headset 106 described in the context of FIGS. 1A and 1B, above.

At step 302, a link quality value is stored. The link quality value may be stored based on monitoring an active telephone call at the headset performing the method 300. During the active call, the link quality value may be calculated by estimating a link quality of the active call. In one or more embodiments, the link quality may be calculated and stored using a link quality estimator, such as the link quality estimator 126, described above in reference to FIG. 1B. Accordingly, in one or more embodiments, a number of link quality values may be stored to a link quality buffer during the active telephone call. For example, a link quality value may be stored every 0.5 second, 1 second, 5 seconds, 10 seconds, etc. during the active telephone call. As noted above, each of the link quality values may represent a measure of one or more of errors, perceived voice quality, listening quality, transmission quality, conversational quality, echo, noise, and distortion of the active call.

When the link quality value is calculated by monitoring the active telephone call, the remaining steps 304-314 of the method 300 may be performed during or after the active telephone call, such that the steps 304-314 are performed in advance of a subsequent incoming or outgoing call at the headset.

At step 304, a plurality of timeslots are scanned. The timeslots are distributed across a plurality of wireless carriers. The scanning may be performed using, for example, the scanner 124 described above in reference to FIG. 1B. In one or more embodiments, the wireless carriers include DECT channels. Accordingly, at step 304, 24 timeslots for each of 10 DECT carriers, or 24 timeslots for each of 5 UPCS carriers, may be scanned. A channel map may be generated based on the scanning. The scanning may include multiple passes on each of the timeslots.

In one or more embodiments, RSSI values are stored based on the scanning. For example, based on the scanning, for each timeslot of the plurality of timeslots, a highest RSSI value may be identified within the timeslot and stored in a data structure associated with the timeslot. Similarly, for each timeslot of the plurality of timeslots, a lowest RSSI value may be identified within the timeslot and stored in a data structure associated with the timeslot. The data structures may be maintained in a scan buffer, such as the scan buffer 125 described above in the context of FIG. 1B. As an option, the RSSI values may be stored during the scanning operation. The RSSI values stored based on the scanning may be reset periodically. For example, RSSI values stored based on the scanning may be reset every 30 seconds, 1 minute, 5 minutes, etc. In particular, after averaging the RSSI values, as described below, the values stored to the scan buffer may be reset for a new time period. Accordingly, the data structure associated with each timeslot may store RSSI values for a limited recent time interval.

Also, at step 306, and based on the scanning, an average radio frequency (RF) density level is calculated for a time period. In one or more embodiments, calculating the average RF density level for the time period includes averaging the highest RSSI values and the lowest RSSI values across the plurality of timeslots. The RSSI values may be averaged at regular intervals. For example, the RSSI values may be averaged to generate a new average RF density level every so many seconds, minutes, or hours.

In one or more embodiments, the average RF density level is stored in association with one or more other previously computed average RF density levels. The average RF density levels may be stored to a circular buffer, such as the circular buffer 135, described above in reference to FIG. 1B. Each of the other average RF density levels may be associated with a different prior time period. For example, the average RF density level may be representative of the prior 0-30 minutes, while a first previously computed average RF density level is representative of a time period between 30-60 minutes prior, a second previously computed average RF density level is representative of a time period between 60-90 minutes prior, and so on. Of course, the time periods may cover any suitable interval. For example, each time period may include a 10-minute, 20-minute, 60-minute, etc.

interval. In one or more embodiments, the total duration of the time periods may be substantially the same as a total duration represented by stored link quality metrics, as described above.

At step 308, a current density level is calculated. The current density level is calculated based on the link quality value and the average RF density level. In embodiments where the average RF density level is stored in association with other previously computed average RF density levels, the calculation may be based on, at least in part, the other previously computed average RF density levels. In other words, where the average RF density level is stored to a circular buffer with other previously computed average RF density levels, the calculation may be based on any portion (e.g., a subset, etc.) of the values stored to the circular buffer. In embodiments where the link quality value is stored in association with other previously calculated link quality values, the calculation may be based on, at least in part, the other previously calculated link quality values. In other words, the calculation may be based on any portion (e.g., a subset, etc.) of link quality values stored to a link quality buffer. In the calculation of the current density level, one or more of the link quality value, the average RF density level, the other previously computed average RF density levels, and the previously calculated link quality values may be weighted to mitigate or exaggerate the effect of the factor relative to the others.

In addition, at step 310, a codec is selected from a plurality of stored codecs. The plurality of stored codecs may be maintained in a codec library, such as the codec library 130 described above in reference to FIG. 1B. The plurality of codecs may include, for example, a high bandwidth stereo codec (e.g., 20 kHz sampling rate, >64 kbps bitrate, etc.), a medium bandwidth wideband codec (e.g., 16 kHz sampling rate, 64 kbps bitrate, etc.), and a low bandwidth narrowband codec (e.g., 8 kHz sampling rate, <64 kbps bitrate, etc.). The codec is selected based on the current density level.

In one or more embodiments, each of the codecs is stored in association with a corresponding density threshold. For example, a low bandwidth narrowband codec may be associated with a highest density threshold, a medium bandwidth wideband codec may be associated with a medium density threshold, and a high bandwidth stereo codec may be associated with the lowest density threshold. In such embodiments, selecting the codec based the current density level may include comparing the current density level to one or more of the corresponding density thresholds. Further, selecting the codec based on the current density level may include identifying at least one codec of the stored codecs that is associated with a density threshold greater than the current density level. Still yet, selecting the codec may include identifying a codec, from the codecs associated with density thresholds greater than the current density level, that is the highest bandwidth codec. Using the example above, if the current density level is below both the density threshold of a low bandwidth narrowband codec and the density level of a medium bandwidth wideband codec, the medium bandwidth wideband codec may be identified as the highest bandwidth codec. Accordingly, the medium bandwidth wideband codec would be selected at step 310.

A command to open an active wireless link is received at step 312. In one or more embodiments, the command is received in response to manipulation of a user control on the headset. The user control may include a switch, a button, or another type of sensor. The user may manipulate the control in an effort to open an active link for a new phone call (i.e., to dial out), or to answer an incoming call.

At step 314, the active wireless link is opened using the selected codec and the associated link type. The wireless link is opened in response to the received command. In one or more embodiments, the wireless link includes a DECT link on at least one channel scanned at step 304.

After opening the wireless link, the headset may encode first call audio using the selected codec. The first call audio may be transmitted over the active wireless link to a base station, for forwarding to a far-end talker. Similarly, after opening the wireless link, the headset may decode second call audio using the selected codec. The second call audio may be received over the active wireless link. Call audio may be sent and received on the wireless link according to the link type associated with the codec. In this way, a headset performing the method 300 may continuously determine the best channel location for it to occupy, as well as the link type that should be used to occupy that channel location. When a request to open a new link is received, the headset opens the new link in a manner that is optimized for both call audio quality and RF density of the headset's environment.

Figure 4:
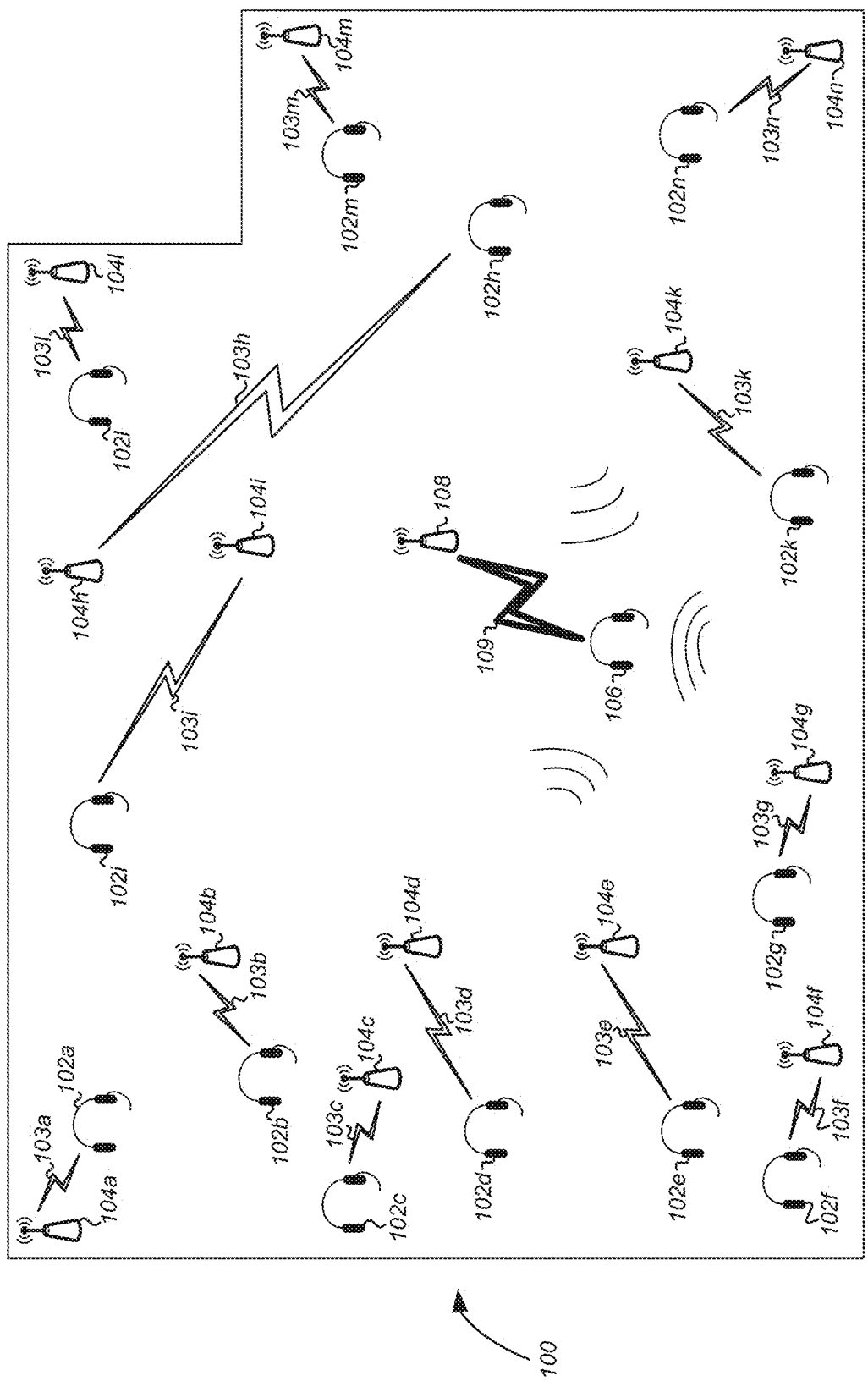
FIG. 4 shows an example of wireless density-based on-the-fly codec and radio frequency link type selection, in accordance with one or more embodiments of the invention.

Referring now to FIG. 4, the headset 106 described previously in the context of FIGS. 1A-1C has successfully opened an active wireless link 109, in place of the inactive link 107, with the base station 108. As described above, prior to opening the active link 109, the headset 106 has scanned the environment 100. In particular, based on the last two hours of outgoing and incoming calls at the headset 106, the headset 106 has determined that call quality has declined from a MOS score estimate of 4.3 to a MOS score estimate of 3.6. This information may be stored to a link quality buffer on the headset 106 that stores audio quality metrics of phones calls for the past 2 hours. Also, the headset 106 has been continuously performing channel mapping of the environment 100, observing the channel usage by the various wireless links 103. In particular, the headset 106 has performed a channel mapping operation by scanning the channels every 30 seconds. During each scan, the headset 106 stores, for each timeslot, the measured highest RSSI carrier value and the measured lowest RSSI carrier value. The highest RSSI carrier values and the lowest RSSI carrier values are observed across the timeslots for a period of 10 minutes and adjusted, as appropriate, with the scan that occurs every 30 seconds. After 10 minutes, the headset 106 averages the highest RSSI carrier values and the lowest RSSI carrier values across the timeslots, and stores the resulting average to a circular buffer. The circular buffer contains 12 different average RF density level records—one record for each 10-minute interval over the last 2 hours. Based on the contents of the link quality buffer and the circular buffer, the headset 106 may recurrently calculate and update a density level. For example, the density level may be recalculated every 30 seconds or 10 minutes. The above operations have proceeded automatically and continuously, without intervention, assistance, or knowledge of the user of the headset 106. When the user attempts to open the active link 109, the headset 106 has calculated, for the environment 100, a density level of 65%.

The headset 106 contains a codec library with 4 different codecs. The first codec is a narrowband mono codec associated with a first link type and a density threshold of 95%. The second codec is a wideband audio codec associated with a second link type and a density threshold of 80%. The third codec is a stereo telephony codec associated with a third link type and a density threshold of 50%. The fourth codec is a full stereo codec associated with a fourth link type and a density threshold of 10%.

When the user of the headset 106 is alerted to an incoming call on his or her line, he presses a "call answer" button on the headset 106. In response to the user pushing the "call answer" button, the headset 106 immediately opens the active link 109 using the second link type and wideband audio codec. In particular, because the current density level of 65% exceeds the density thresholds associated with the full stereo codec (10%) and the stereo telephony codec (50%), neither of those two codecs can be used. Further, between the narrowband mono codec and the wideband audio codec, the wideband audio codec will provide the best call quality. This may be determined using a priority value attributed to each codec. Accordingly, the headset 106 may be prepared to open the link 109 using the wideband audio codec before the user is even alerted to the incoming call.

As the day wears on into the late afternoon, and the user's coworkers head home, many of the wireless links 103 are terminated. As this happens, the user's call quality increases. Also, as this happens, the spectral density of the environment 100 is reduced, as reflected in the average RF density level records maintained by the headset 106. Accordingly, when a call is received a few hours later at the headset 106, the density level has been previously calculated to be at 5%. Now, when the user answers the incoming call, the headset immediately opens a new wireless link using the fourth link type and the full stereo codec. In other words, the headset 106 has automatically selected a link type and codec for the user in a manner that maximizes the experience of the user, as well as the other users of the headsets 102 in the environment 100.

The systems and methods described herein provide means for selecting codecs and RF link types in a manner that provides the best audio to any given user in an environment, while maximizing the user density for the environment. The selection is based on an RF spectral density level of the environment, which is continuously tracked based on channel scanning and link quality monitoring. In this way, the RF link type and codec selection may be done on-the-fly and without any perceptible delay or mid-call loss of link quality to the user. Crowded enterprise offices often suffer from excessive RF interference, and such interference is only expected to increase as wireless devices become more common and users demand greater bandwidth for their devices. Thus, the systems and methods described herein mitigate the detrimental effects of such advancements, including poor audio reception and/or transmission when using a wireless DECT headset or DECT handset.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method, comprising:
storing a link quality value;
while maintaining an inactive wireless link with a paired device, scanning a plurality of timeslots across a plurality of wireless carriers;
based on the scanning, calculating an average radio frequency density level for a time period spanning the plurality of timeslots, wherein the average radio frequency density level is a level of user density over a predefined radio frequency spectrum, wherein the user density represents a number of active users operating in an area having devices sharing the predefined radio frequency spectrum;
calculating a current density level using the link quality value and the average radio frequency density level;
selecting, based on the current density level, a codec from a plurality of stored codecs, wherein the selected codec is associated with a link type;
receiving a command to convert the inactive wireless link to an active wireless link; and
in response to the command, opening the active wireless link with the paired device using the selected codec and the associated link type.

2. The method of claim 1, comprising:
based on the scanning, storing, for each timeslot of the plurality of timeslots, a highest received signal strength indication value identified within the timeslot; and
based on the scanning, storing, for each timeslot of the plurality of timeslots, a lowest received signal strength indication value identified within the timeslot,
wherein calculating the average radio frequency density level for the time period includes averaging the highest received signal strength indication values and the lowest received signal strength indication values across the plurality of timeslots.

3. The method of claim 1, comprising:
during an active call, calculating the link quality value by estimating a link quality of the active call.

4. The method of claim 1, comprising:
encoding first call audio for transmission over the active wireless link using the selected codec; and decoding second call audio received over the active wireless link using the selected codec.

5. The method of claim 1, comprising:
storing the average radio frequency density level in association with one or more other previously computed average radio frequency density levels, wherein each previously computed average radio frequency density level is associated with a different prior time period,
wherein the calculation of the current density level is further based on the one or more other previously computed average radio frequency density levels.

6. The method of claim 1,
wherein the plurality of wireless carriers includes a plurality of DECT channels, and
wherein the active wireless link includes a DECT link on at least one channel of the plurality of DECT channels.

7. The method of claim 1,
wherein each codec of the plurality of stored codecs is associated with a corresponding density threshold, and
wherein selecting the codec based on the current density level includes comparing the current density level to one or more of the corresponding density thresholds and identifying at least one codec of the plurality of stored codecs that is associated with a density threshold greater than the current density level.

8. The method of claim 7, wherein selecting the codec includes selecting a highest bandwidth codec from the at least one codec of the plurality of stored codecs that is associated with the density threshold greater than the current density level.

9. A system comprising:
a link quality buffer storing a link quality value;
a user control;
a circular buffer;
a codec library;
at least one processor; and
memory coupled to the at least one processor, the memory having stored therein instructions which when executed by the at least one processor, cause the at least one processor to perform a process for wireless density-based on-the-fly codec and radio frequency link type selection, the process including:
while maintaining an inactive wireless link with a paired device, scanning a plurality of timeslots across a plurality of wireless carriers,
based on the scanning, calculating an average radio frequency density level for a time period spanning the plurality of timeslots, wherein the average radio frequency density level is a level of user density over a predefined radio frequency spectrum, wherein the user density represents a number of active users operating in an area having devices sharing the predefined radio frequency spectrum,
storing the average radio frequency density level to the circular buffer, calculating a current density level using the link quality value and contents of the circular buffer,
selecting, based on the current density level, a codec from the codec library, wherein the selected codec is associated with a link type,
based on a manipulation of the user control, receiving a command to convert the inactive wireless link to an active wireless link, and
in response to the command, opening the active wireless link with the paired device using the selected codec and the associated link type.

10. The system of claim 9, wherein the instructions, when executed by the at least one processor, cause the at least one processor to perform the process including:
based on the scanning, storing, for each timeslot of the plurality of timeslots, a highest received signal strength indication value identified within the timeslot; and
based on the scanning, storing, for each timeslot of the plurality of timeslots, a lowest received signal strength indication value identified within the timeslot,
wherein calculating the average radio frequency density level for the time period includes averaging the highest received signal strength indication values and the lowest received signal strength indication values across the plurality of timeslots.

11. The system of claim 9, wherein the instructions, when executed by the at least one processor, cause the at least one processor to perform the process including: during an active call, calculating the link quality value by estimating a link quality of the active call.

12. The system of claim 9, wherein the instructions, when executed by the at least one processor, cause the at least one processor to perform the process including:
storing the average radio frequency density level to the circular buffer in association with one or more other previously computed average radio frequency density levels, wherein each previously computed average radio frequency density level is associated with a different prior time period,
wherein the calculation of the current density level is further based on the one or more other previously computed average radio frequency density levels.

13. The system of claim 9,
wherein the plurality of wireless carriers includes a plurality of DECT channels, and
wherein the active wireless link includes a DECT link on at least one channel of the plurality of DECT channels.

14. The system of claim 9,
wherein each codec of the codec library is associated with a corresponding density threshold, and
wherein selecting the codec based on the current density level includes comparing the current density level to one or more of the corresponding density thresholds and identifying at least one codec of the codec library that is associated with a density threshold greater than the current density level.

15. The system of claim 14, wherein selecting the codec includes selecting a highest bandwidth codec from the at least one codec of the codec library that is associated with the density threshold greater than the current density level.

16. A non-transitory computer-readable media embodying instructions executable by a processor to perform functions comprising:
storing a link quality value;
while maintaining an inactive wireless link with a paired device, scanning a plurality of timeslots across a plurality of wireless carriers;
based on the scanning, calculating an average radio frequency density level for a time period spanning the plurality of timeslots, wherein the average radio frequency density level is a level of user density over a predefined radio frequency spectrum, wherein the user density represents a number of active users operating in an area having devices sharing the predefined radio frequency spectrum;
calculating a current density level using the link quality value and the average radio frequency density level;

selecting, based on the current density level, a codec from a plurality of stored codecs, wherein the selected codec is associated with a link type;

receiving a command to convert the inactive wireless link to an active wireless link; and in response to the command, opening the active wireless link with the paired device using the selected codec and the associated link type.

17. The non-transitory computer-readable media of claim 16, wherein the instructions are executable by the processor to perform functions comprising:

based on the scanning, storing, for each timeslot of the plurality of timeslots, a highest received signal strength indication value identified within the timeslot; and based on the scanning, storing, for each timeslot of the plurality of timeslots, a lowest received signal strength indication value identified within the timeslot, wherein calculating the average radio frequency density level for the time period includes averaging the highest received signal strength indication values and the lowest received signal strength indication values across the plurality of timeslots.

18. The non-transitory computer-readable media of claim 16, wherein the link quality value is calculated during an active call by estimating a link quality of the active call.

19. The non-transitory computer-readable media of claim 16, wherein each codec of the plurality of stored codecs is associated with a corresponding density threshold, and wherein selecting the codec based on the current density level includes comparing the current density level to one or more of the corresponding density thresholds and identifying at least one codec of the plurality of stored codecs that is associated with a density threshold greater than the current density level.

20. The non-transitory computer-readable media of claim 19, wherein selecting the codec includes selecting a highest bandwidth codec from the at least one codec of the plurality of stored codecs that is associated with the density threshold greater than the current density level.

* * * * *